Scott J. Schwartz
Inventor
by Thomas N. Tarrant
Attorney

Scott J. Schwartz
Inventor
by Thomas J. [signature]
Attorney

Feb. 2, 1971 S. J. SCHWARTZ 3,560,933

MICROPROGRAM CONTROL APPARATUS

Filed Jan. 2, 1968 3 Sheets-Sheet 3

*Scott J. Schwartz*
*Inventor*
*by* [signature]
*Attorney*

United States Patent Office 3,560,933

Patented Feb. 2, 1971

3,560,933

MICROPROGRAM CONTROL APPARATUS

Scott J. Schwartz, Sharon, Mass., assignor to Honeywell Inc., Minneapolis, Minn., a corporation of Delaware Filed Jan. 2, 1968, Ser. No. 694,928
Int. Cl. G05b *15/00;* G06f *15/20*
U.S. Cl. 340—172.5 19 Claims

ABSTRACT OF THE DISCLOSURE

The present invention relates to subcommand control in an electronic data processing system. In particular it relates to control systems in which microprogram sequences are stored in a nondestructive readout memory from which they are selected by master program instructions and used to direct the micro operations in the central processor. In accordance with the invention, one field of bits from a word in the nondestructive readout memory is used to switch a second field of bits from controlling one set of micro operations to any one of several sets. In the overall system, the one field of bits was obtained nearly "free" by sharing bits used for branch addresses.

BACKGROUND

In the early 1950's M. V. Wilkes (see "The Best Way To Design An Automatic Calculating Machine," Manchester University Inaugural Conference, July 1951, pp. 16–18) propoesd a computer which would have a variable instruction set. Normally a fixed set of instructions is available to the programmer, each one being made up of a succession of elementary or "micro operations." The implementation of these micro operations constitutes the design of most of the machine. For each instruction, the micro operation sequence is usually fixed in the machine design. What Wilkes proposed was a means by which a programmer could assemble micro operations into any instruction they were inherently capable of executing. In this way, a machine's instruction repertoire could be altered from day to day as its applications varied. This was the origin of the idea of "microprogramming."

As a means for implementing this kind of thing, the need for a memory to store micro operation sequences was postulated. The device used for such a memory is usually referred to today as a Read Only Memory or nondestructive readout memory. In any event, reference is to a memory which can be altered by a programmer but usually not by the machine. Hereinatfer this memory is referred to by the abbreviation "ROM."

The device that performs the micro operation sequencing in a computer is usually referred to as the control element. The ROM control elements described herein store a plurality of words with each word consisting of a plurality of bits. All bits of a word are read out in parallel and they cumulatively specify a set of micro operations to be executed either simultaneously or sequentially as specified by some external clock. Thereafter another word is read out and executed in similar fashion and so on.

In the most simple usage of an ROM control element, each bit of a word is used to generate one micro operation. So a bit position in a word will contain a "1" if the corresponding micro operation is desired in that word, otherwise it will be a "0." Since the micro operations used in a computer frequently run into many hundreds, the above arrangement requires a large and costly memory.

There are ways of drastically reducing the ROM capacity requirement implied by such a configuration. The value of doing this depends upon the cost of an ROM bit relative to that of the logic elements used for the remainder of the system. All of these ways involve the addition of some logic.

The first of these methods is to break the micro operations into groups and assign ROM bits to represent the members of each group in coded form. Thus for a group of M micro operations, B bits suffice where: $M \leq 2^B - 1$. But this gives the restriction that only one micro operation of a group may appear in any given word. It is this restriction that dictates that the minimum number of groups must at least equal the number of micro operations in the word which has the largest number of micro operations. Using this scheme, the requirement for ROM bits can usually be reduced so that 2 to 3 micro operations per bit can be obtained.

The major drawback to grouping in the above manner is the requirement that the micro operations of a group be mutually exclusive on a word basis. This limits the ability to arbitrarily change the microprogram without rewiring the decoders and the versatility is lost.

The above scheme is referred to as fixed decoding and it was the weakness of fixed decoding that provided the impetus leading to the present invention. The decoding concept of the present invention has been entitled "Adaptive Decoding." What was wanted was a method by which to change the way the ROM bits were interpreted without having to rewire the machine. This gave rise to the idea of using a few bits in the ROM to specify how the remaining bits were to be interpreted for micro operation generation. In turn this led to Adaptive Decoding.

Adaptive Decoding, as it was eventually implemented, behaves as follows. A few bits are set aside to describe how the remaining bits will be used. Each configuration of these few bits specifies a set of micro operations that are represented directly, without further decoding, by the remaining bits. In this respect, adaptive decoding is similar to the use of an ROM without any decoding. Each time the specification bits are changed, the remaining bits are assigned to another set of micro operations.

Adaptive Decoding has been found to yield an efficiency level of more than four micro operations for each ROM bit with more immunity to hardware change than fixed decoding.

Thus it is an object of the invention to provide a novel ROM control element.

It is a further object of the invention to provide a novel decoding system for ROM control elements.

It is still a further object of the invention to provide a decoding system for microprogram control apparatus in which the bits in one field of a memory word define the micro operations that the bits in a second field of a memory word shall signify.

Further objects and features of the invention will become apparent upon reading the following description together with the drawings.

DESCRIPTION

Figure 1:
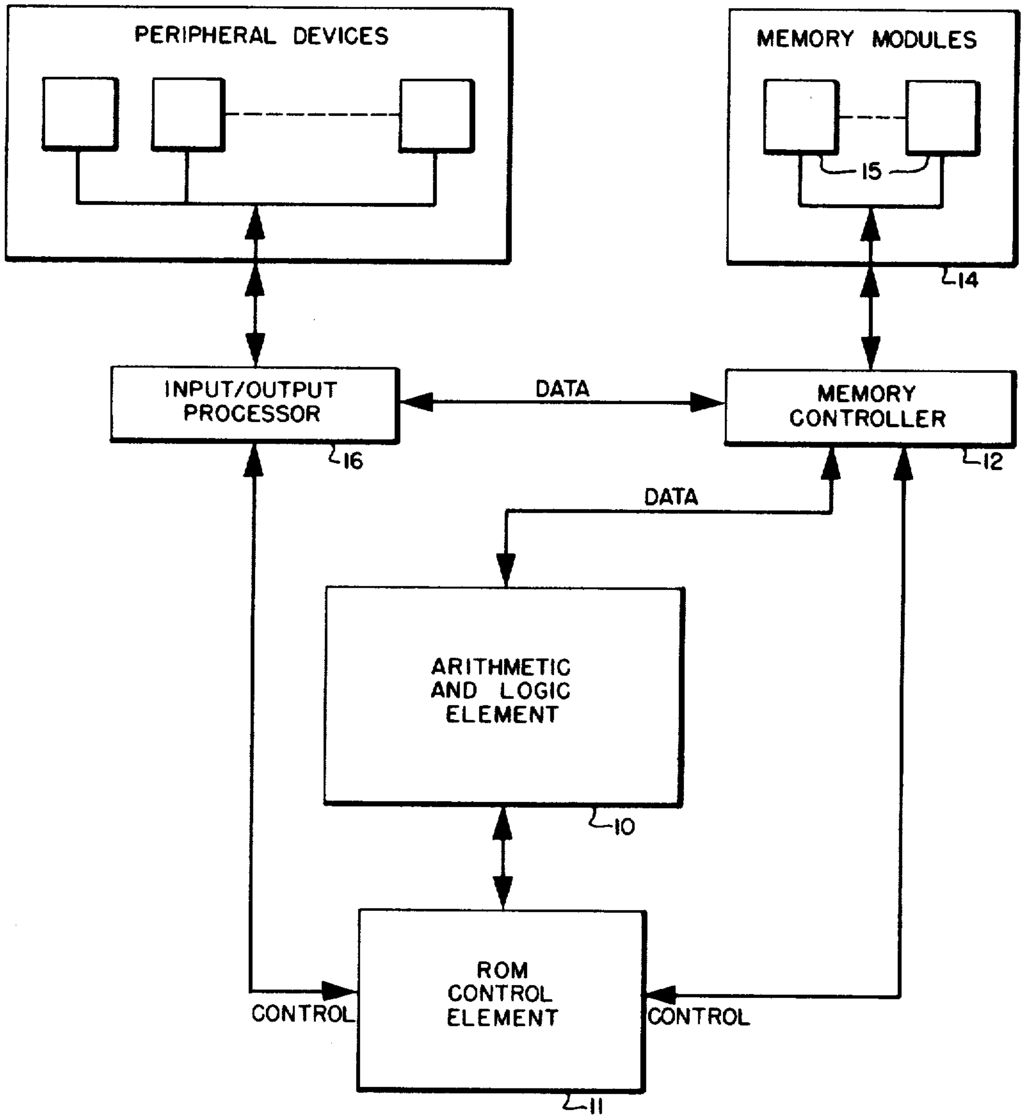
FIG. 1 is a simplified overall block diagram of an electronic data processing system.

FIG. 1 is a block diagram of the major pieces of an electronic data processing system showing the usage of an ROM control element. All operations within Arithmetic and Logic Element 10 are under control of ROM Control Element 11. For memory operations, addresses and data formed within Arithmetic and Logic Element 10 are placed in interface registers and then Memory Controller 12 is signalled by Control Element 11 to start a memory operation. Memory 14 may have several independently operable modules 15 and if the one addressed is not being used by Input/Output Processor 16, then the memory operation proceeds under control of Memory Controller 12. At some fixed time before the delivery of data, control element 11 is appraised of the data availability and at the proper moment strobes it into Arithmetic and Logic Element 10.

Input/Output instructions are extracted from Memory 14 by Arithmetic and Logic Element 10 under control of Control Element 11 and are processed up to the point where the peripheral device is ready to be turned on to initiate the transfer of data or whatever use is required. At this point, Control Element 11 signals Input/Output Processor 16 which commences to receive the information it requires from Arithmetic and Logic Element 10. The data path for this transfer is through Memory Controller 12. Since both Input/Output Processor 16 and Arithmetic and Logic Element 10 need such a data path, it is available for their intercommunication. This communication is asynchronous and can be stalled at any time should the need arise; for instance when Input/Output Processor 16 needs a memory access for some peripheral operation already in progress. When the communication is complete, the input/output operation can proceed, which then occurs under control of Input/Output Processor 16.

Figure 2:
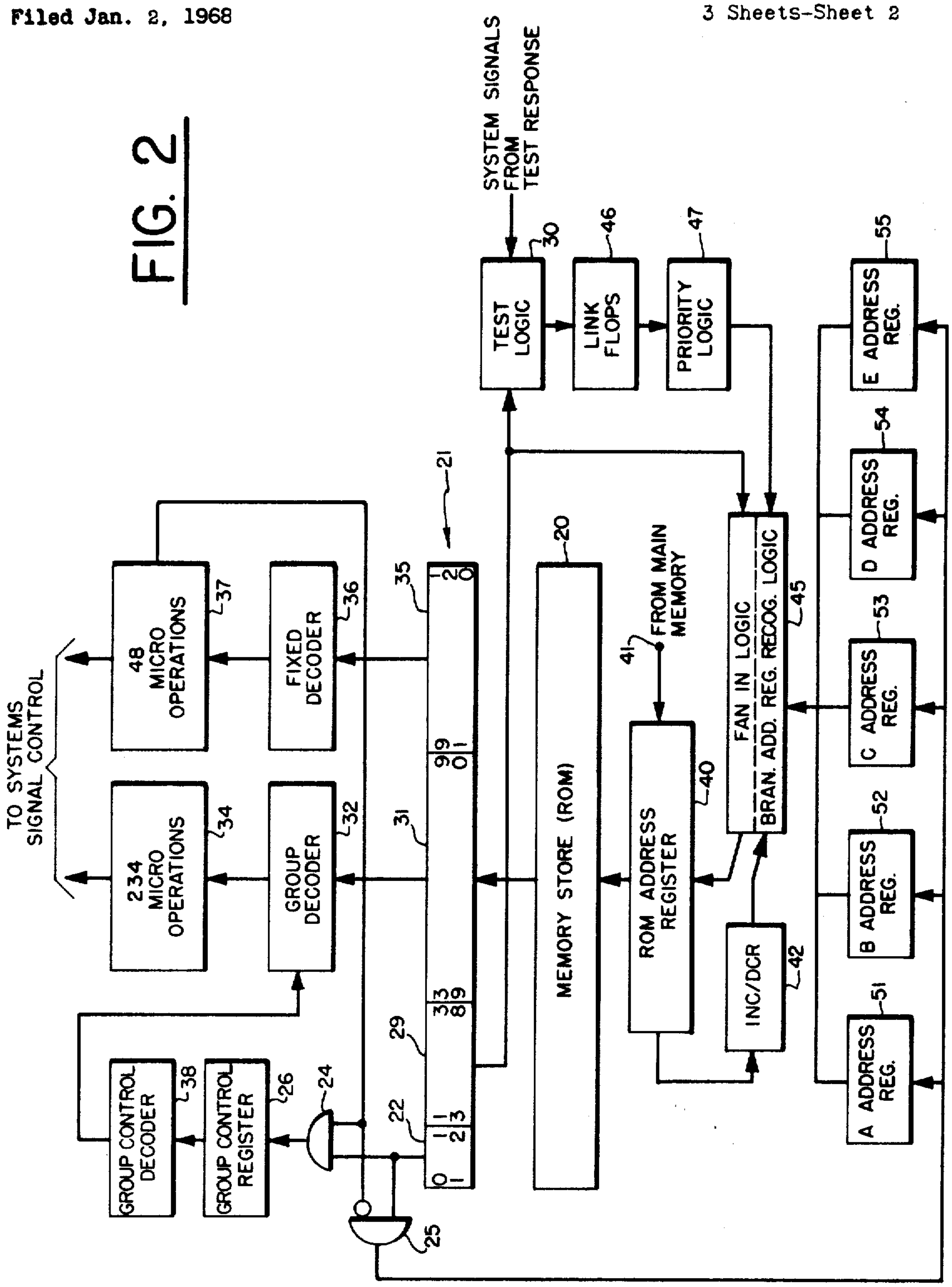
FIG. 2 is a block diagram of an ROM control element according to one aspect of the invention.

Further description of the present invention will be given with respect to a specific embodiment of an ROM control element. A block diagram of this control element is illustrated in FIG. 2. ROM 20, which may be a rectangular array of bistable devices, is shown in FIG. 2 connected to Output Register 21. ROM 20 is a fast access memory with a capacitor of, for example, 2000 words of 120 bits each. Register 21 is a single word storage register that operates cyclically at the ROM cycle time as an output register for words addressed in ROM 20. Register 21 shows the 120 bits divided into four "fields." First field 22 is connected by gates 24 and 25 respectively to Group Control Register 26 and Branch Address Registers 51 through 55. Group Control Register 26 is an auxiliary storage register.

Field 22 is connected either through gate 24 or gate 25. Some of the words in ROM 20 will have a field 22 of specification bits for Group Control Register 26 while others wil have bits to provide other control signals. These other control signals are described herein as branch addresses which are entered in Branch Address Registers 51 to 55. They may also be signals for additional micro operations and may be decoded in a fixed manner or as a function of specification bits in Register 26. In the illustrated embodiment, first field 22 consists of 12 bits which are gated to the proper register by a micro operation controlling gates 24 and 25. Gates 24 and 25 are depicted as single logic elements only for purposes of illustration. Since gate 25, as shown by a circle, has an inhibitor input, both gates 24 and 25 operate alternatively. That is, when gate 24 is conditioned for activation by a micro operation, gate 25 is inhibited by the same micro operation. It is to be understood that field 22 of Output Register 21 is transferred in parallel by gating or other circuitry conventional for such purpose.

Second field 29 of 26 bits is depicted as connected to Test Logic network 30. Depending on the micro operations being performed, bits in field 29 control testing of selected conditions in the Central Processor. The results of this testing is used in determining microprogram branching.

Third field 31 of 52 bits is connected to Group Decoder 32 which operates as the switch referred to previously for switching these bits from one set of micro operations to another. In this embodiment, the output of Group Decoder 32 controls 234 micro operations 34.

Fourth field 35 of 30 bits is connected to Fixed Decoder 36 with an output controlling 48 micro operations 37.

Bits from Group Control Register 26 are decoded by logic networks in Group Control Decoder 38. The output of Group Control Decoder 38 is connected to Group Decoder 32 to provide switching of the bits in field 31 from one set of micro operations to another.

ROM 20 is addressed by ROM Address Register 40. A commencement address is entered into Address Register 40 usually from the main memory by an input terminal 41. Further addresses are obtained by incrementing the address register through incrementer 42. Branch addresses are also frequently required and these are stored in five Branch Registers 51 through 55 previously described.

A "branch on stored test" instruction is provided from field 29 to operate Branch Control Device 45. Priority Logic 47 connects Link Flops 46 to Branch Control Device 45. Test Logic network 30 is connected to Link Flops 46 and serves to set selected bistable devices in Link Flops 46 depending on the test results. Upon a "branch on stored test instruction," the bistable devices of Link Flops 46 are scanned and the first one in the priority sequence that is set, gates the output of the respective branch address register to ROM Address Register 40. When none of the bistable devices are set, then no real branching takes place and the address for the next ROM cycle is the incremented previous address. When one of the bistable devices is set, then the respective branch address is entered directly in ROM Address Register 40 and incrementer 42 is inhibited.

Operation of the ROM control element illustrated in FIG. 2 begins with an address from the main memory applied to terminal 41 for entry into ROM Address Register 40. This beginning address is the result of instructions programmed into the main memory. The address in register 40 selects a word in ROM 20 which in turn appears in Output Register 21.

In most microprogram sequences, the first word has group control specification bits in field 22. This fact is indicated by bits in field 35 and one of micro operations 37 is actuated to transfer field 22 to Group Control Register 26. Group Control Register 26 will provide temporary storage for the transferred bits until another word containing group control specification bits is entered in register 21.

In the embodiment being described, only 12 group control bits required. Since 16 unique decodes can be obtained from four bits, 4 bits would have been more than adequate. However, in the embodiment being described, a 12 bit field is used since this same field is needed for branch addresses. By storing the specification bits in Register 26 and using them for a sequence, field 22 is free for branch addresses in the other words of the sequence. With a 12-bit field, only 1 bit has to be "true" at a time to provide the group control decode. This simplifies the decoding logic The contents of Group Control Register 26 is decoded by Group Control Decoder 38. In the described embodiment, decoder 38 has 97 output decodes. These 97 outputs are activated in different arrangements depending on which of the bits in field 22 is "true." The control decodes of decoder 38 are connected to a network of gating circuits in Group Decoder 32 to which signal inputs are provided from field 31 in Output Register 21.

In a word containing specification bits in field 22, field 31 may well contain all zeros. In the specific embodiment used for an example herein, all micro operations represented in a single word are operations to be performed simultaneously. While this is not necessary for the invention, it simplifies the hardware by avoiding the necessary timing circuits required for sequencing operations specified in a single word.

Most microprogram sequences begin with such preliminary micro operations as obtaining addresses and transferring words from the main memory to registers in arithmetic unit. In the exemplary embodiment, these preliminary micro operations are all specified in field 35 of the ROM word. Since there are usually no other micro operations to be performed simultaneously, there will be no instructions in field 31.

While the above obviates any problems due to delay in transferring specification bits to register 26 and the following cascaded gating circuits, this has not been found to be a limting factor. In the exemplary embodiment, a ROM cycle of 125 nanoseconds provided ample time to actuate micro operations 34 during the same cycle in which specification bits were transferred to register 26. To avoid ambiguity in doing this, it is desirable to either delay micro operations 34 until the contents of register 26 is changed, or to clear register 26 by a micro operation of the previous word.

In the exemplary embodiment, at the end of the ROM cycle in which the first word of the microprogram sequence was read, the following conditions exist: A first group of preliminary micro operations have been performed by Fixed Decoder 36; specification bits have been set up in register 26 and decoded by decoder 38; and Address Register 40 has been incremented. At the onset of the next ROM cycle, the incremented address produces a new ROM word in Output Register 21.

In the general case, this new word will provide additional fixed decode micro operations specified by field 35 as well as micro operations specified by the combination of field 31 and the condition of Group Decoder 32. Field 22 of the new word may contain an ROM address. This address will represent a branch to a new microprogram sequence that may be needed dependent on some future condition. Gate 25 transfers the branch address from field 22 to one of the five registers in Branch Registers 27. After the second word, processing will start showing results that may require tests to determine whether a branch sequence of micro operations is required. For example, in binary arithmetic it is necessary to perform different operations sometimes when carries exist as opposed to operations with no carry present.

Bits in field 29 operate test logic circuits 30 to determine such things as the presence or absence of carries. The test responses are used to set Link Flops 46. Certain words in a microprogram sequence will sometimes be followed by branching. These words contain a branch instruction which checks the condition of Link Flops 46. In the embodiment used by way of example, the bistable elements of Link Flops 46 are checked in priority sequence, i.e., 1–2–3 etc., and Branch Control Device 45 gates the register of Branch Registers 51 through 55 corresponding to the highest priority element "set" into the ROM address register. This branch address produces a word in a branch microprogram sequence. The new sequence continues until another branch instruction or until the end of the microprogram.

Figure 3:
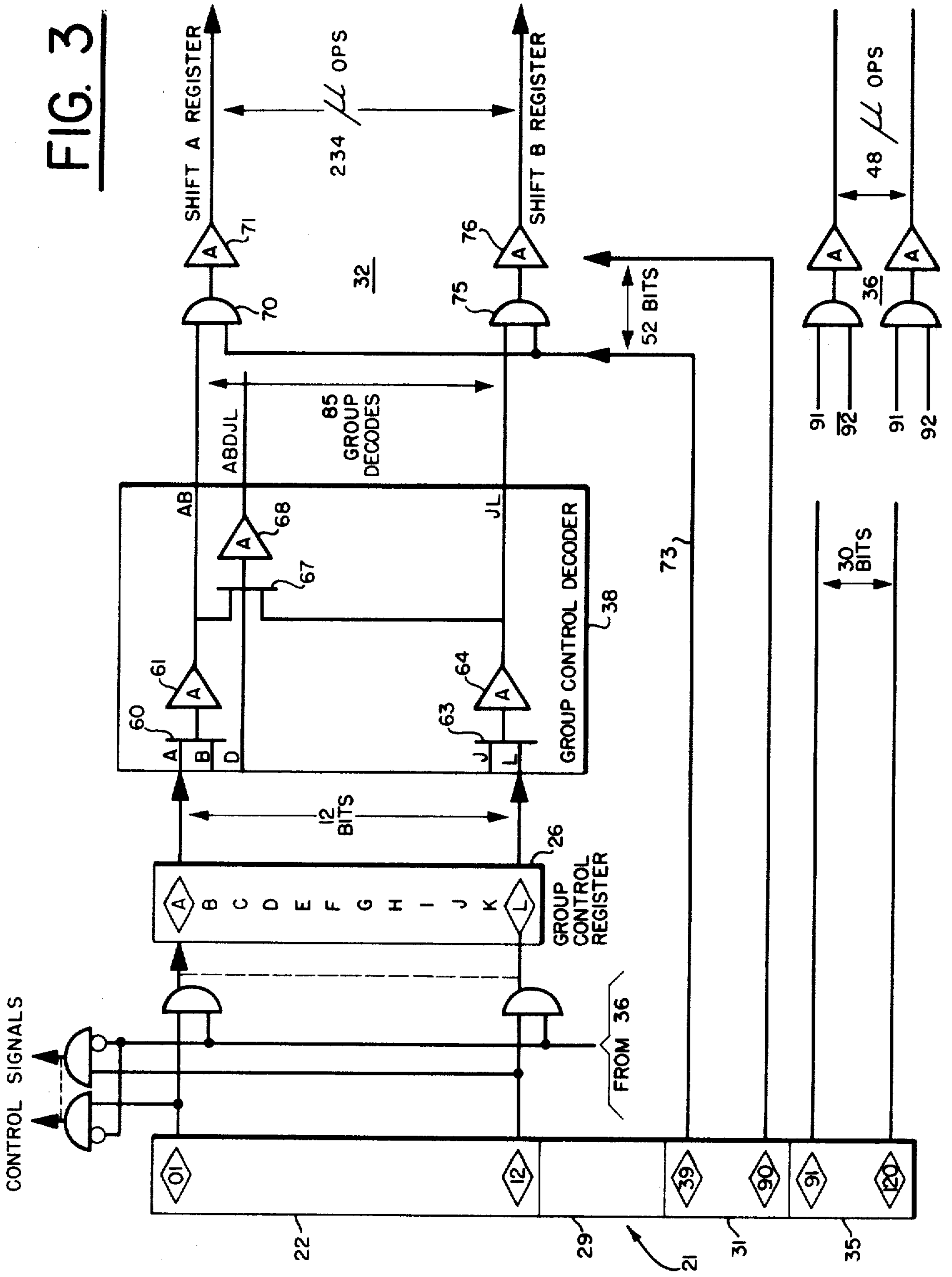
FIG. 3 is a diagrammatic illustration of adaptive decoding according to the invention.

The adaptive decoding system itself is shown in greater detail in FIG. 3. Where applicable the same reference numbers are used in FIG. 3 as in FIG. 2. Output Register 21 and Group Control Register 26 are shown in block form with leads indicating bit readout. The 12 bits of field 22 are designated by the first 12 letters of the alphabet in register 26. As has already been stated, these 12 bits are used because they are available "free." That is, field 22 is required to provide 12 bits for branch addresses in many, but not all of the words. As it works out, the words in which it is desirable to place group control specification bits are words in which branch addresses are unnecessary. In the absence of this ready availability of the 12 bits, four bits would be required to give 16 unique outputs for the adaptive decoding system in this embodiment.

Group Control Decoder 38, groups the outputs of register 26 into 85 group decodes by means of logical "OR" circuits. This is necessary since[4] many micro operations will be common to many different microprogram sequences. While the 85 group decodes do not represent all possible "OR" groupings, they provide enough to give the versatility required in the particular case. In this system it was not necessary to "OR" group more than 5 specification bit places together. Since the actual gating is still too extensive for the purposes of a patent application, only exemplary circuitry is shown in the form of logic diagrams.

Outputs A and B of register 26 are "OR'd" together by gate 60 and amplified by amplifier 61 to provide group control decode AB. Likewise outputs J and L of register 26 are OR'd together by OR gate 63 and amplified by amplifier 64 to provide group control decode JL. OR gate 67 ORs together the AB decode, the JL decode and the D output of register 26 to get the 5-bit OR decode ABDJL which is amplified by amplifier 68.

The 85 group control decodes together with the 12 undecoded outputs of register 26 supply 97 inputs to Group Decoder 32.

Field 31 of Output Register 21 has 52 undecoded outputs which are supplied directly to Group Decoder 32. The absence of coding the outputs of field 31 enables tremendous versatility in rewriting microprogram words in ROM 20. These 52 outputs are each connected directly to AND gates in Group Decoder 32. Each output from field 31 is connected to a plurality of AND gates each of which acutates a micro operation. The other input to each AND gate will be either a direct or a decoded output from register 26.

In the embodiment depicted, 234 AND gates each followed with an amplifier are used to provide the drive signals for 234 micro operations. Two of the gates are illustrated in logic diagram form by way of example. To attempt illustrating more than an example would be impractical for the purposes of the present patent application. AND gate 70 followed by amplifier 71 is connected by one leg to group control decode AB and by a second leg to line 73, the output from bit position 39 in field 31 of Output Register 21. The output of amplifier 71 provides the subcommand, "Shift A Register." Thus if bit 39 in register 21 is true and either A or B in register 26 is true, A register receives a command to shift. While not depicted specifically, it will be recognized that many of the outputs of Group Control Decoder 38 will be connected to more than one gate of Group Decoder 32.

Field 35 of Output Register 21 is depicted as having 30 bits with output connections to Fixed Decoder 36. This fixed decoding has previously been described as prior art. It is not essential to the adaptive decoding described above. While an example of fixed decoding is depicted, no further description is necessary for purposes of the present invention.

While the exact arrangements to be used in a specific application of adaptive decoding may appear difficult to arrive at, such is not necessarily the case. In the embodiment described, it was the goal to perform the required micro operations using 12 specification bits (field 22) and 52 command bits (field 31). Further, one set of specification bits should cover a microprogram sequence so that field 22 could be left free for branch addresses. Still further it was desired to keep logic and coding arrangements to a minimum, both to minimize hardware and leave the greatest flexibility for making decoding changes by ROM rewrite. In the simplest form of subcommand rewriting it should be possible to treat each bit separately. This was in fact possible in the described embodiment. Only one of the specification bits is true for any one sequence of micro operations. Also one of the subcommand bits controls only one micro operation for a given specification bit. While these limitations are not essential to the broader aspects of adaptive decoding, they simplify the gating problem and make subcommand rewriting quite easy.

For the exemplary embodiment, with the above limitations in mind, all sequences of micro operations were analyzed and divided into 12 groups where each group required no more than 52 micro operations. Gating the 52 subcommand bits with each of the 12 specification bits gives a total of 624 possible unique outputs. However, due to the same micro operations appearing in several sequence groups, 234 unique outputs were required.

These 234 outputs required the 85 combinational decodes from group control decoder 38. The word sequence as used herein is not limited to a complete microprogram, but also defines two or more short sequences into which a microprogram has been divided.

In using a fixed decode group as with field 35, it is convenient to assign the micro operations most common to all sequences to the fixed decodes. This takes some of the burden off the Group Control Decoder and reduces the maximum number of micro operations appearing in most sequences for the adaptive decoder.

While the invention has been described with relation to a specific embodiment, many variations thereof are possible within the scope of the invention. Adaptive decoding permits a far greater number of micro operations per ROM bit than the 2 or 3 commonly obtained with straight fixed decoding. More important, adaptive decoding actually improves the ease of making changes by memory rewrite. While the described embodiment only provides slightly over 4 micro operations for each bit position assigned to it, this can be increased dramatically by adding specification bits. It can be seen that the addition of one specification bit can provide for 52 additional micro operations. Thus it is intended to claim the invention broadly within the spirit and scope of the appended claims.

What is claimed is:

1. An electronic data processing control element for storing microprogram control instructions and providing micro operation control signals comprising:

(a) memory means for storing a plurality of microprogram instruction words each consisting of a plurality of bits divided into a plurality of fields;

(b) output register means connected to said memory means for reading out said words one at a time;

(c) decoding means connected to decode a first one of said fields of bits from said register means into a plurality of group control decodes; and, (d) micro operation generating means connected to said decoding means, said generating means comprising:

(1) a plurality of micro operation signal means each connected to provide a micro operation control signal;

(2) circuit means for connecting a second one of said fields of bits from said register means with each bit to a different set of said plurality of signal means, said circuit means including logic means for connecting said group decodes of said decoding means to each of said signal means whereby said second field of bits operates a different set of said signal means for each change of said group control decodes.

2. An electronic data processing control element according to claim 1 in which said circuit means further comprises means connecting a separate one of said group control decodes each to a respective one of said sets of said signal means and said logic means enabling the operation of said signal means only on the conjunction of the respective group control decode with a "true" state of the respective bit of said second field whereby said group control decodes operate to switch bits of said second field of bits from one set of said signal means to a plurality of other sets.

3. An electronic data processing control element according to claim 1 in which said memory means for storing is a nondestructive readout fast access memory.

4. An electronic data processing control element according to claim 1 in which said decoding means consists of a system of OR logic whereby each bit of said first field of bits provides a plurality of decodes that are common to selected other bits of said first field.

5. An electronic data processing control element according to claim 1 in which each of said signal means comprises an amplifier and said circuit means comprises an AND gate at the input of each said amplifier, each said AND gate having a first input from said output register representing a bit position of one bit in said second field and a second input from one bit decode of said group control decodes whereby both said one bit decode of said group control decodes and the one bit in said second field must be true conjunctively at said first and second input to operate the respective amplifier.

6. An electronic data processing control element according to claim 1 in which both said decoding means and said micro operation generating means are arranged so as to eliminate conjunctive decoding of bits in said first field and said second field with other bits within the same field thereby permitting extensive revision of microprogram sequencing to be made by memory word rewriting alone.

7. An electronic data processing control element according to claim 1 wherein said logic means are interconnected to each of said signal means so as to provide at least four micro operations for each bit in said first and second fields combined.

8. In microprogram control apparatus comprising a read only memory, an output register for reading microprogram instruction words from said memory, and means coupled to said output register for decoding words in said output register and generating micro operations therefrom, the combination in said means for decoding comprising:

(a) a fixed decoder for decoding a first set of bits in said register representing micro operations that are the most common to all microprogram sequences;

(d) an input connection to said address register for set of bits in said register, said group control decoder comprising a plurality of OR logic circuits each having inputs from two or more bit positions of said register and providing a corresponding plurality of output group control decodes;

(c) a group decoder coupled to said control decoder and adapted for generating micro operations from a third set of bits in said register as enabled by said plurality of control decodes from said group control decoder.

9. The combination according to claim 8 in which said fixed decoder and said group decoder are adapted to generate from said first set and said second set of bits respectively at least three times as many micro operations as each of the number of bits in said first set, said second set and said third set of bits combined.

10. An electronic data processing control element for storing microprogram instructions and providing micro operation control signals comprising:

(a) a nondestructive readout memory for storing a plurality of instruction words each consisting of a plurality of bits which are divided into at least three fields that can be read out in parallel;

(b) an output register coupled to said memory and adapted for receiving a selected word read out of said memory;

(c) an address register coupled to said memory and adapted for selecting said word;

(d) an input connection to said address register for supplying thereto a microprogram start address;

(e) incrementing means connected to said address register to sequentially increment said address therein;

(f) fixed decoding means coupled to said output register and adapted for decoding a first field of bits from said output register into a first set of micro operations;

(g) a group control register connected to said output register for receiving a second field of bits therefrom;

(h) means connected to said fixed decoding means and to said group control register, said means responsive to one micro operation of said first set to gate a second field of bits from said output register into said group control register;

(i) means connected to said output register in parallel with said last recited means and adapted to provide an alternate path for gating said second field of bits to a plurality of output terminals in the absence of said one micro operation;

(j) a group control decoder coupled to said group control register and adapted for decoding bits in said group control register into a set of group control signals; and, (k) group decoding means coupled to said group control decoder and to said output register, said group decoding means being adapted for decoding a third field of bits from said output register as a function of said group control signals to provide a second set of micro operations.

11. Apparatus for translating control signals in electronic digital systems comprising:

(a) cyclical storage means for providing a sequence of control words each having a plurality of bits divided into at least first and second portions, one word per cycle;

(b) auxiliary storage means operatively connected to said cyclical storage means for storing at least one of said portion of one control word;

(c) decoding means operatively connected to both said cyclical storage means and said auxiliary storage means adapted to translate control signals from said second portions of said words provided by said cyclical storage means as a function of the contents of said auxiliary storage means; and, (d) means to selectively transfer the bits of said first portion of one of said control words from said cyclical storage means to said auxiliary storage means during one cycle and maintain said bits in said auxiliary storage means during sequential cycles to translate control signals from said second portions of a sequence of words whereby the entire first word portion in each of the following words of said sequence is left free for other information.

12. An electronic data processing control element for storing microprograms and directing micro operations comprising:

(a) an addressable memory for storing a plurality of instruction words each word consisting of a plurality of bits divided into a number of fields accessible in parallel;

(b) an output register connected to said memory and adapted to store said fields of an addressed word read from said memory;

(c) an auxiliary register connected to said input register and adapted to be associated with a first of said fields;

(d) a plurality of output terminals connected to provide control signals associated with said first field;

(e) gating logic connected between said output register, and said auxiliary register and between said output register and said output terminals for selective gating of said first field alternatively to said auxiliary register and said output terminals;

(f) group decoding means for providing micro operations;

(g) output connections from said output register for applying a second of said fields to said group decoding means;

(h) a connection interconnecting said auxiliary register and said group decoding means so that the bits of said second field are decoded by said group decoding means as a function of the contents of said auxiliary register; and (i) a connection between an output of said output register and said gating logic, said connection being adapted to condition said gating logic to gate said first field to said auxiliary register in response to a characteristic of the word in said output register applied to said output, whereby the gated contents of said first field from said one memory word may be temporarily stored by said auxiliary register to provide a decoding function for said second field of each word of a sequence of memory words while the first field of each of the remaining memory words in said sequence is used to provide other control signals.

13. An electronic data processing control element according to claim 12 in which said element further includes incrementing means connected to said address register and being operative to sequentially increment an address contained therein.

14. An electronic data processing control element according to claim 12 in which said group decoding means includes a plurality of micro operation signal generating devices, said output connections connecting each bit position of said output register constituting said second field to a set of said plurality of micro operation signal generating devices and said connection between said auxiliary register and said group decoder connected to said micro operation signal generating means so as to select at least one set from said plurality for each bit position of said second field.

15. An electronic data processing control element according to claim 12 which further includes a fixed decoder connected to said output register and adapted to receive bits of a third field and to generate additional micro operations therefrom, and said fixed decoder being connected to condition the output of said output register for said selective gating of said first field.

16. An electronic data processing control element according to claim 15 in which said fixed decoder is further adapted for decoding said third field of each of said words coded to contain additional micro operations which are those most common to all microprograms.

17. An electronic data processing control element according to claim 12 in which said other control signals are coded as branch addresses for transfer to a utilization device from said plurality of output terminals.

18. An electronic data processing control element according to claim 12 in which said other control signals of said remaining words are decoded by said group decoding means as a function of the contents of said auxiliary register.

19. An electronic data processing control element for storing microprograms and providing subcommands comprising:

(a) a nondestructive readout addressable memory for storing a plurality of instruction words each consisting of a plurality of bits divided into a plurality of fields that can be read out in parallel;

(b) an address register connected to said memory and being adapted for selecting a word in said memory;

(c) an output register coupled to said memory and being adapted to receive bits of a first one of said fields from said output register;

(d) a group control register connected to said output register and adapted to receive bits of a first one of said fields from said output register;

(e) a group control decoder connected to said control register for decoding said first field of bits into a set of group control decodes;

(f) group decoding means connected to said output register for decoding a second one of said fields of bits in said output register as a function of said group control decodes to provide subcommand signals;

(g) a plurality of output terminals connected to said output register and adapted to receive bits of said first field and to provide subcommand signals therefrom; and, (h) means connected to said group control register and said output terminals, said means adapted to selectively enable and inhibit respectively the connection of bits to said group control register and said output terminals in response to a subcommand to transfer bits of said first field either to selected one of said plurality of output terminals or to said group control register.

References Cited

UNITED STATES PATENTS

| | | | |
|---|---|---|---|
| 3,268,871 | 8/1966 | Handler et al. | 340—172.5 |
| 3,302,183 | 1/1967 | Bennett et al. | 340—172.5 |
| 3,325,788 | 6/1967 | Hackl | 340—172.5 |
| 3,380,025 | 4/1968 | Ragland | 340—172.5 |
| 3,389,376 | 6/1968 | Packard | 340—172.5 |
| 3,391,394 | 7/1968 | Ottaway et al. | 340—172.5 |

OTHER REFERENCES

"IBM Technical Disclosure Bulletin" vol. 5, No. 9, February 1963, pp. 45–46, Microprogrammed Computer Control by Schlaeppi.

PAUL J. HENON, Primary Examiner

P. R. WOODS, Assistant Examiner

UNITED STATES PATENT OFFICE
CERTIFICATE OF CORRECTION

Patent No. 3,560,933 Dated February 2, 1971

Inventor(s) Scott J. Schwartz

It is certified that error appears in the above-identified patent and that said Letters Patent are hereby corrected as shown below:

Column 8, lines 32 and 33, "(d) an input connection to said address register for" should read -- (b) a group control decoder for decoding a second --.

Signed and sealed this 17th day of August 1971.

(SEAL)
Attest:

EDWARD M.FLETCHER,JR.
Attesting Officer

WILLIAM E. SCHUYLER, JR.
Commissioner of Patents

M PO-1050 (10-69)

USCOMM-DC 60376-P69
☆ U.S. GOVERNMENT PRINTING OFFICE : 1969 O—366-334